(12) United States Patent
Gustafsson et al.

(10) Patent No.: US 11,665,607 B2
(45) Date of Patent: May 30, 2023

(54) METHOD AND APPARATUS FOR HANDLING CONNECTIONS BETWEEN WIRELESS NETWORK NODES AND WIRELESS DEVICES

(71) Applicant: Telefonaktiebolaget LM Ericsson (PUBL), Stockholm (SE)

(72) Inventors: Roland Gustafsson, Bengtsfors (SE); Tomas Nylander, Värmdö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 331 days.

(21) Appl. No.: 17/255,024

(22) PCT Filed: Jun. 27, 2018

(86) PCT No.: PCT/SE2018/050694
§ 371 (c)(1),
(2) Date: Dec. 22, 2020

(87) PCT Pub. No.: WO2020/005127
PCT Pub. Date: Jan. 2, 2020

(65) Prior Publication Data
US 2021/0266806 A1   Aug. 26, 2021

(51) Int. Cl.
*H04W 4/00* (2018.01)
*H04W 36/14* (2009.01)
(Continued)

(52) U.S. Cl.
CPC ....... *H04W 36/14* (2013.01); *H04W 36/0085* (2018.08); *H04W 36/24* (2013.01)

(58) Field of Classification Search
CPC . H04W 36/14; H04W 36/0085; H04W 36/24; H04W 48/16; H04W 48/18
(Continued)

(56) References Cited

U.S. PATENT DOCUMENTS

2007/0019670 A1* 1/2007 Falardeau ............. H04W 48/18
370/465
2013/0273887 A1   10/2013 Hole
2014/0355507 A1   12/2014 Amerga et al.

FOREIGN PATENT DOCUMENTS

EP   3 197 213 A1   7/2017
WO   2013 027183 A1   2/2013

OTHER PUBLICATIONS

PCT International Search Report issued for International application No. PCT/SE2018/050694—dated Nov. 13, 2018.
(Continued)

*Primary Examiner* — Marcos Batista
(74) *Attorney, Agent, or Firm* — Baker Botts L.L.P.

(57) ABSTRACT

A method is disclosed for handling connections between a wireless device (120, 130) and a first wireless network node (110), of a serving network (150) in a wireless communications network (100). The wireless device (120, 130) is connected to the first WNN (110). The wireless communications network (100) further comprises a neighbor network (160) comprising a second WNN (140). The method comprises obtaining (202) a roaming priority indication, RPI, associated with the wireless device (120, 130), indicating that the wireless device (120, 130) has a higher priority for transfer of its network connection than another WD without priority. The method comprises obtaining (204) information that the neighbor network (160) is a network to which the RPI applies, and obtaining (206) measurements related to at least one the connection between the WD (120, 130) and the first WNN (110), and a wireless communications link between the WD (120, 130) and the second WNN (140), and, based on the obtained measurements, the obtained information and the RPI, initiating (208) a transfer of the WD's (120, 130) network connection from the first WNN (110) to the second WNN (140).

19 Claims, 10 Drawing Sheets

(51) Int. Cl.
 *H04W 36/00* (2009.01)
 *H04W 36/24* (2009.01)
(58) Field of Classification Search
 USPC .......................... 455/412, 434–436; 370/331
 See application file for complete search history.

(56) References Cited

OTHER PUBLICATIONS

PCT Written Opinion of the International Searching Authority issued for International application No. PCT/SE2018/050694—dated Nov. 13, 2018.

\* cited by examiner

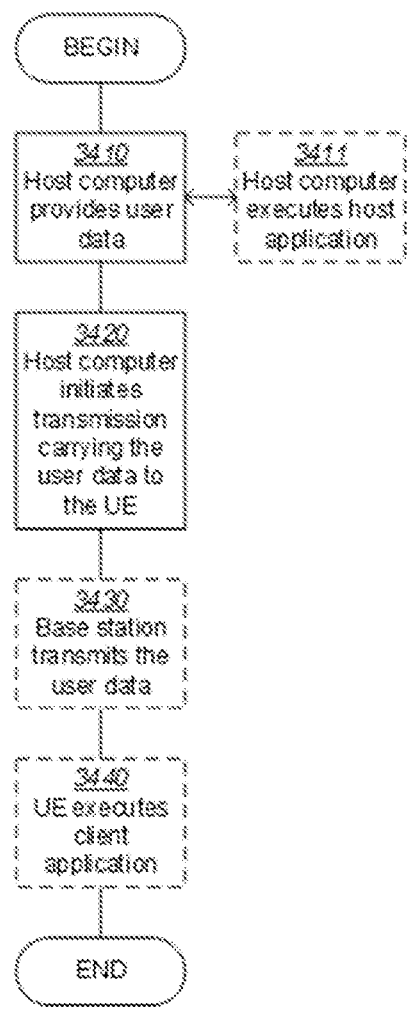
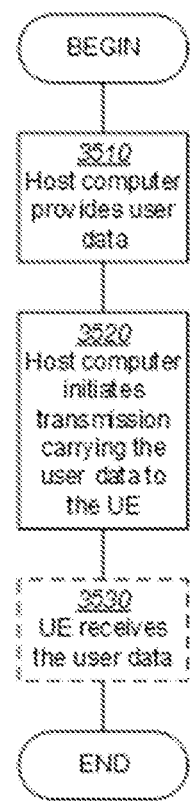
Fig. 11                    Fig. 12

METHOD AND APPARATUS FOR HANDLING CONNECTIONS BETWEEN WIRELESS NETWORK NODES AND WIRELESS DEVICES

PRIORITY

This nonprovisional application is a U.S. National Stage Filing under 35 U.S.C. § 371 of International Patent Application Serial No. PCT/SE2018/050694 filed Jun. 27, 2018 and entitled "Method and Apparatus for Handling Connections Between Wireless Network Nodes and Wireless Devices" which is hereby incorporated by reference in its entirety.

TECHNICAL FIELD

The present disclosure relates generally to methods, systems and devices for handling connections between wireless network nodes and wireless devices. The present disclosure further relates to computer programs and carriers corresponding to the above methods and nodes.

BACKGROUND

In today's wireless communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), or GSM network, or other cellular network or system, such as, a future 5G wireless communications network, e.g. New Radio (NR) just to mention a few possible technologies for radio communication. A wireless communications network is run by a Mobile Network Operator, MNO, and comprises network nodes, i.e. base stations or radio base stations, providing radio coverage over at least one respective geographical area forming a cell. The cell definition may also incorporate frequency bands used for transmissions, which means that two different cells may cover the same geographical area but using different frequency bands. Wireless devices, WDs, also known as mobile stations, terminals, and/or User Equipment, UEs, are served in the cells by the respective network node and are communicating wirelessly with respective network node. The wireless devices transmit data over an air or radio interface to the network nodes in uplink, UL, transmissions and the network nodes transmit data over an air or radio interface to the wireless devices in downlink, DL, transmissions.

Having a persistent network connection for wireless devices such that session continuity is maintained when switching between cells and/or network nodes, is something that is considered important in a variety of different settings today. As more and more devices are becoming connected, including devices which have functionalities which heavily rely on a steady network connection, the tolerance for losing connectivity is decreasing.

Furthermore, in some technology areas which rely on a steady and continuous network connection, a loss of connection may be associated with danger or at least adverse effects which are very undesirable for a user.

One of the relevant cases to consider when it comes to the continuity of a session is when wireless devices switch between networks, especially when the networks have different network operators. An area where this is especially important is the area of autonomous driving, AD, which requires seamless connectivity to the backend systems when switching between network operators, especially since the vehicle manufacturers are liable and need to be in control of the AD mode, for example in order to cancel the AD mode and leave control to the driver in case of an unforeseen event.

Consequently, there exists a need for improvement when it comes to session continuity for wireless devices, especially when switching between networks having different network operators.

SUMMARY

It is an object of the invention to address at least some of the problems and issues outlined above. An object of embodiments of the invention is to enable improved performance and differentiation of performance levels for wireless devices on an individual level, especially when it comes to transfer of the network connection of a wireless device between a serving network and a neighbor network. Even though improved performance may be desirable for all users, all users are not willing to pay for it, and therefore enabling differentiation on an individual user level is desirable. It is possible to achieve these objects and others by using a method and an apparatus as defined in the attached independent claims.

According to one aspect, a method for handling communications between a wireless device and a first wireless network node of a serving network in a wireless communications network is provided, performed by a system of the wireless communications network. The wireless device has a network connection to the first wireless network node. The wireless communications network further comprises a neighbor network comprising a second wireless network node. The method comprises obtaining a roaming priority indication, RPI, associated with the wireless device, the RPI indicating that the wireless device has a higher priority for transfer of its network connection than another wireless device not having the RPI. The method further comprises obtaining information that the neighbor network is a network to which the RPI applies. The method further comprises obtaining measurements related to at least one the connection between the wireless device and the first wireless network node, and a wireless communications link between the wireless device and the second wireless network node. The method further comprises initiating, based on the obtained measurements, the obtained information and the RPI, a transfer of the wireless device's network connection from the first wireless network node to the second wireless network node.

According to another aspect, a method for handling communications between a wireless device and a first wireless network node of a serving network in a wireless communications network is provided, performed by the wireless device. The wireless device has a network connection to the first wireless network node. The wireless communications network further comprises a neighbor network comprising a second wireless network node. The wireless device has a Roaming Priority Indication, RPI, associated with it, the RPI indicating that the wireless device has a higher priority for transfer of its network connection than another wireless device not having the RPI. The method comprises obtaining information that the neighbor network is a network to which the RPI applies. The method further comprises performing measurements related to the connection between the wireless device and the first wireless network node and a wireless communications link between the wireless device and the second wireless network node. The method further comprises initiating, based on the RPI, the obtained information and on the measurements, a transfer of the wireless device's network connection from the first wireless network node to the second wireless network node.

According to another aspect, a system operable in a wireless communications network, configured for handling connections between a wireless device and a first wireless network node of a serving network in the wireless communications network is provided. The wireless communications network further comprises a second wireless network node of a neighbor network. The system is operable to provide a network connection to the wireless device. The system comprises processing circuitry and a memory. The memory contains instructions executable by said processing circuitry, whereby the system is operative for obtaining a roaming priority indication, RPI, associated with the wireless device, the RPI indicating that the wireless device has a higher priority for transfer of its network connection than another wireless device not having the RPI. The system is further operative for obtaining information that the neighbor network is a network to which the RPI applies. The system is further operative for obtaining measurements related to at least one the connection between the wireless device and the first wireless network node, and a wireless communications link between the wireless device and the second wireless network node. The system is further operative for initiating, based on the obtained measurements, the obtained information and the RPI, a transfer of the wireless device's network connection from the first wireless network node to the second wireless network node.

According to another aspect, a wireless device operable in a wireless communications network for handling connections between the wireless device and a first wireless network node of a serving network in the wireless communications network is provided. The wireless device is operable to have a network connection to the first wireless network node. The wireless communications network further comprises a second wireless network node of a neighbor network. The wireless device has a Roaming Priority Indication, RPI, associated with it, the RPI indicating that the wireless device has a higher priority for transfer of its network connection than another wireless device not having the RPI. The wireless device is operative for obtaining information that the neighbor network is a network to which the RPI applies. The wireless device is further operative for performing measurements related to the connection between the wireless device and the first wireless network node and a wireless communications link between the wireless device and the second wireless network node. The wireless device is further operative for initiating, based on the RPI, the obtained information and on the measurements, a transfer of the wireless device's network connection from the first wireless network node to the second wireless network node.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIGS. 11 to 14 are flowcharts illustrating methods implemented in a communications network including a host computer, a wireless network node and a wireless device.

DETAILED DESCRIPTION

Figure 1:
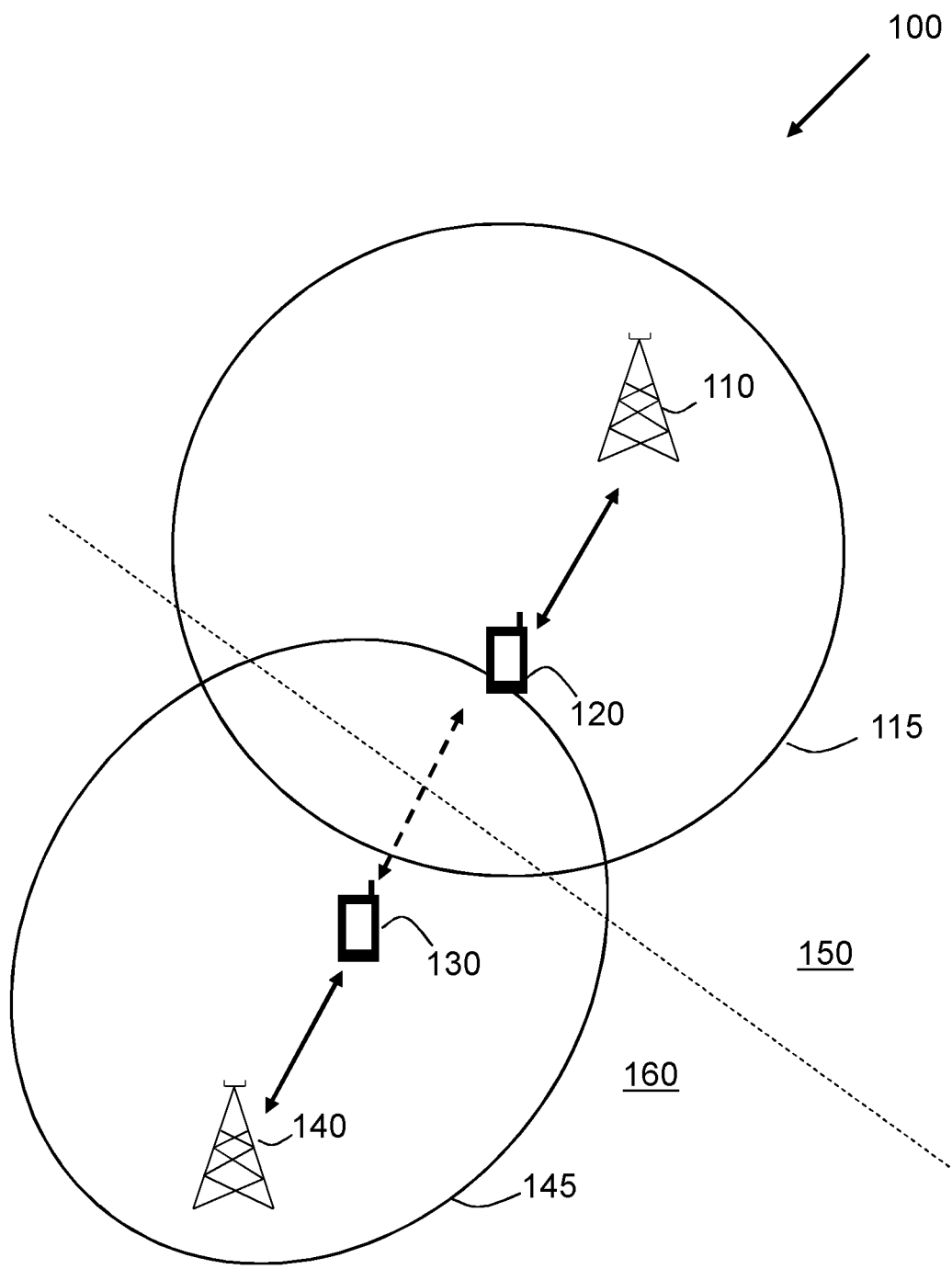
FIG. 1 is a is a schematic block diagram illustrating embodiments of a wireless device and a wireless network node in a wireless communications network.

Briefly described, systems and methods are provided for handling connections between a wireless device, WD, and wireless network nodes, WNNs, of a wireless communications network, which make it possible to differentiate network behavior between individual WDs. This entails new possibilities for network operators to provide different performance level to different users, as well as possibilities to charge users differently depending on the performance required, especially for charging a premium for users requiring high performance. In other words, it becomes possible for core and RAN networks to take subscription information of a user into account when deciding on if certain features should be triggered or used.

Presently available functionality in 3GPP, which may be used to improve seamless connectivity between networks, includes the concept of using Equivalent Public Land Mobile Network, EPLMN, lists, as well as using inter-PLMN handovers. However, an obstacle to providing different performance levels to different individual users has been that the current 3GPP features which may be used to improve roaming and session continuity are not on an individual level, but on a network or Radio Access Network, RAN, level, which has made it impossible to offer certain features only to certain individual users, companies or organizations.

An insight relevant for the present disclosure, is that there has traditionally been a lack of business incentives for MNOs to activate, configure and agree on session continuity in roaming agreements, i.e. when switching network connection for a WD between different MNOs. However, with increasing prevalence of new technologies which rely heavily on session continuity, such as autonomous driving and Cooperative Intelligent Transport Systems, C-ITS, there is an increased possibility for a sound business model wherein Original Equipment Manufacturers, OEMs, transport companies as well as individual users may be willing to pay for having improved session continuity when switching between networks. The present disclosure provides a solution for offering improved performance on an individual level, especially when it comes to maintaining session continuity when switching between networks having different MNOs.

The present solution introduces a new concept of a Roaming Priority Indication, RPI, wherein a RPI can be associated with a WD. The RPI indicates that the WD has a higher priority for transferring its network connection than WDs not having the RPI. The may be performed by a system in a wireless communications network. The wireless communication network comprises a first WNN belonging to a serving network and a second WNN belonging to a neighbor network. The WD has a (wireless) network connection to the first WNN. The system obtains the RPI associated with the WD. The system further obtains information that the second WNN, and thus the neighbor network, supports RPI functionality, i.e. that the neighbor network is a network to which the WD has a higher priority for transfer of its network connection than another WD not having the RPI. The system further obtains measurements related to at least one of the connection between the WD and the first WNN, and a wireless communications link between the WD and the second WNN. The measurements on the wireless communications link between the WD the second WNN are used to determine if the second WNN is suitable for the WD to have a network connection to. Based on the obtained measurements, the obtained information and the RPI, the system initiates a transfer of the WD's network connection from the first WNN to the second WNN, such that the transfer of the network connection of the WD is given higher priority than transfers of network connections of WDs which do not have the RPI.

The concept of RPI may be realized by having an agreement in place between MNOs regarding which neighbor networks a WD's network connection is allowed to be transferred to with a higher priority than WD's not having the RPI. In some embodiments, this may comprise that the transfer of the WD's network connection has a higher performance associated with it than a transfer of the network connection of a WD not having the RPI. Higher performance may in some embodiments entail that the transfer is performed faster.

Even though there currently are requirements on transfers of WD's connections when it comes to maintaining service continuity for e.g. active circuit switched services and active GPRS services, session continuity is not ensured in all cases, especially not when switching between a serving network and a neighbor network. Further, even the slightest delay in response time can be critical for applications such as autonomous driving, which entails that any improvement to service and/or session continuity is desirable.

Looking now at FIG. 1, a wireless communications network 100 in which embodiments herein may be implemented is shown. The wireless communications network 100 may be a radio communications network, and at least parts of the wireless communications network may communicate via LTE, LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other cellular network or system, such as, a future 5G wireless communications network, e.g. New Radio (NR).

The network 100 comprises a first WNN, 110, which may e.g. be an eNB, eNodeB, or a Home Node B, a Home eNode B, femto Base Station (BS), pico BS, a gNB, or any other network unit capable to serve a WD in the wireless communications network 100. The first WNN 110 belongs to a serving network and provides coverage to a first cell 115, within which a WD 120, 130 is located in a first position 120, wherein the WD 120, 130 in the first position 120 has a network connection the first WNN. The network 100 further comprises a second WNN 140 belonging to a neighbor network, which provides radio coverage to a second cell 145. In embodiment described herein, the WD is able to receive signals from the second WNN in the first position 120. The WD has the capability to move from a first position 120 to a second position 130, wherein the WD is located within the cell of the second WNN in the second position 130, which also entails that the WD is better served by the second WNN 140 than the first WNN 110 in the second position 130.

The present disclosure is applicable to virtually all types of different communications networks, although it is especially relevant in the case wherein the first WNN 110 and the second WNN 140 belong to different network operators. When switching between networks belonging to different operators, the process of transferring the connection of the WD generally takes much longer time than when transferring the connection of the WD between networks and/or network nodes belonging to the same network operator.

Traditionally, when the network connection of the WD 120, 130 is transferred from the first WNN to the second WNN, there is an interruption in the session continuity such that the WD would lose its ongoing IP session, due to the WD having to be authenticated by the second WNN before the second WNN could accept a transfer of the WD's connection from the first WNN. However, by using the new concept of Roaming Priority Indication, the operators of the serving network and the neighbor network can agree to treat transfer of connections of WDs having the RPI with a higher performance than transfer of connection of WDs not having the RPI.

Figure 2:
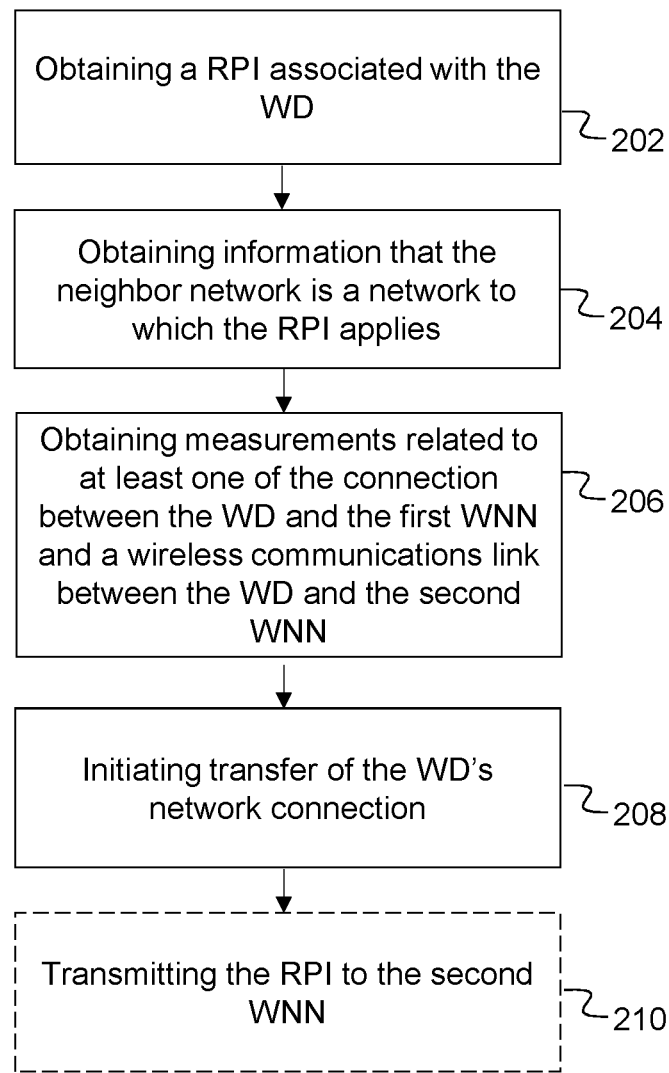
FIG. 2 schematically shows method steps of a first embodiment of a method for handling connections.

FIG. 2, in conjunction with FIG. 1, shows an embodiment of a method performed by a system in a wireless communications network 100. The wireless communications network 100 comprises a first WNN 110 of a serving network 150 and a second WNN 140 of a neighbor network 160. As will be understood, the serving network 150 and/or the neighbor network 160 may comprise additional network nodes. A WD, 120, 130 has a network connection to the first WNN, and is able to receive signals from the second WNN. The system of the wireless communication network 100 that performs the method may be a wireless communication network node, such as a core network node or an access network node or a router, for example the first WNN. Alternatively, the system of the wireless communication network that performs the method may be a group of network nodes, wherein functionality for performing the method are spread out over different physical, or virtual, nodes of the network. In other words, the system for handling WD connection may be a cloud-solution, i.e. the system may be deployed as cloud computing resources that may be distributed in the network.

The method comprises obtaining 202 a Roaming Priority Indication, RPI, associated with the wireless WD 120, 130, wherein the RPI indicates that the WD 120, 130 has a higher priority for transfer of its network connection than another WD not having the RPI.

In some embodiments, the WD having a higher priority for transfer of its network connection may entail that a transfer of the network connection of a WD having RPI has a better performance than a transfer of the network connection of a WD not having the RPI, wherein different procedures for transfer of the WD's network connection are used depending on if the WD has a RPI or not. In some embodiments, the WD having a higher priority for transfer of its network connection may entail that the WD is allowed to transfer its connection, while a WD not having the RPI would not be allowed to transfer its connection. In some embodiments, the WD having a higher priority for transfer of its network connection may entail that the WD takes priority over transfers of network connections for WDs not having the RPI. In some embodiments, the WD having a higher priority for transfer of its network connection may entail that a transfer of the WD's network connection is initiated by the serving network, and wherein a device not having the RPI entails that the serving network does not initiate a transfer of the WD's network connection.

The method further comprises a step of obtaining 204 information that the neighbor network is a network to which the RPI applies, i.e. that the neighbor network is a network in which the WD has a higher priority for transfer of its network connection than a WD not having the RPI. This may be seen as a step for checking whether or not the second WNN, and subsequently also the neighbor network, supports RPI functionality. In some embodiments, the second WNN can give priority for the concerned WD in case of congestion. In case it would be determined that the second WNN, and subsequently also the neighbor network, does not support RPI functionality, i.e. that the WD does not have a higher priority for transfer of its network connection than a WD not having the RPI in the network of the second WNN, then the transfer of the WD's connection would proceed as usual without involving the concept of RPI.

The method then comprises a step of obtaining 206 measurements related to at least one of the connection between the WD and the first WNN, and a wireless communications link between the WD and the second WNN. This step is intended to determine whether the WD would be better served by the first WNN or the second WNN, which depends on factors such as the WD's location, the signal quality of the first WNN, the signal quality of the second WNN, and similar factors.

The method further comprises a step of initiating 208 a transfer of the WD's network connection from the first WNN to the second WNN, based on the obtained measurements from step 206, the obtained information from step 204, and the obtained RPI from step 202. The initiating step 208 is based on the obtained RPI and the information obtained in 204 in the sense that a prioritized transfer of the WD's network connection requires that the WD has a RPI associated with it, and it also requires that the second WNN supports RPI functionality. In some embodiments, the step of initiating 208 a transfer is only performed when the measurements obtained in step 206 indicates that a transfer of the WD's network connection to the second WNN would be preferable for maintaining a stable network connection. In some embodiments, the transfer of the WD's network connection will be initiated as a transfer procedure with a higher performance than a transfer of the network connection of a WD not having the RPI. In some embodiments, the second WNN may see from the type of transfer being initiated by the first WNN that the transfer is for a WD having a RPI. In some embodiments, the second WNN does not need to know that the WD has a RPI associated with it when accepting a transfer from the first WNN, the second WNN will instead later receive the RPI associated with the device, e.g. as subscription or policy information, and may use it the next time the WD will move to a new WNN.

Transfer of the WD's connection with most prior art technologies comprises that the WD detaches from the old network and then attaches to the new network, which entails that the WD loses its ongoing IP session, in other words session continuity cannot be maintained. One advantage of the present disclosure is that it enables transfers of the network connection of a WD between networks with different operators, without the WD losing its ongoing IP session.

The transfer of the WD's connection may be handover, performed by the system, an idle mode mobility transfer of the WD's connection, or it may be a Release with Redirect transfer of the WD's connection, i.e. that the first WNN releases the WD's network connection and directs the WD where to go, wherein the direction may be a specific frequency band, a specific network node, a specific network or similar.

By having a method as described above, involving the new concept of RPI, it becomes possible to differentiate between WDs on an individual level, which may result in faster and better transfers of network connections for WD users, especially for premium users.

In some embodiments, the method further comprises transmitting 210 the RPI to the second WNN, prior to or as a part of the initiating 208 the transfer of the WD's network connection. By having this step, the second WNN and subsequently also the neighbor network, has information that that the WD is associated with a RPI, which may in some embodiments be a requirement in order for the second WNN to accept a prioritized handover of the WD from the first WNN. In some embodiments, the second WNN can give priority for the concerned WD in case of congestion by knowing that the WD has a RPI associated with it. By the second WNN having information that the WD is associated with an RPI before the network connection of the WD is transferred to the second WNN, the second WNN can ensure that the WD should be given priority for transfer of its network connection compared with WDs not having a RPI.

In some embodiments, the obtaining 204 of information that the neighbor network is a network to which the RPI applies comprises obtaining an Equivalent Public Land Mobile Network, EPLMN, list comprising a list of PLMNs to which the WD has a higher priority for transfer of its network connection than another WD not having the RPI, wherein the EPLMN list comprises the neighbor network. As previously described, the concept of RPI may be based on an agreement between MNO's regarding between which networks a WD's network connection may be transferred while treating the transfer as a transfer with higher performance than a transfer of a WD not having RPI. The result from such an agreement may be an EPLMN list comprising the Mobile Country Code, MCC, and the Mobile Network Code, MNC, of each network, to which the network connection of a WD having a RPI may be transferred with a higher priority than network connections of WD's not having the RPI. In some embodiments, the method further comprises transmitting the EPLMN list to the second WNN prior to or as a part of initiating a transfer of the WD's network connection.

By having an EPLMN list with information regarding which networks may be treated equally for the purpose of transferring the network connection of a WD, and or/by basing the step 206 of obtaining measurements on the information obtained in step 204, better decisions can be made regarding where a WD's network connection should be transferred and regarding which network nodes the WD should perform measurements on, which entails a better usage of radio resources and also enables a better future planning of radio resource usage. For example, a WD could be instructed to only perform measurements on and/or report measurements from network nodes belonging to networks present in the EPLMN list, i.e. in networks supporting RPI functionality.

In some embodiments, the step of obtaining 206 measurements related to at least one of the connection between the WD and the first WNN, and a wireless communications link between the WD and the second WNN is based on the obtained information that the neighbor network is a network to which the WD has a higher priority for transfer of its network connection than another WD not having the RPI, such that the measurements in step 206 are only obtained after it has been ascertained that the second WNN is a network in which the RPI applies.

In some embodiments, the step of obtaining 204 an EPLMN list comprises configuring the EPLMN list. The EPLMN list may be configured by the first WNN, or it may be configured by the core network and then transmitted to the first WNN. Typically, an EPLMN list is specific to a network node, such that different network nodes can have different EPLMN lists associated with them. As previously mentioned, an EPLMN list typically comprises the MCC and the MNC of all networks in which a WD with RPI has a higher priority for transfer of its network connection than a WD not having the RPI.

In some embodiments, all network nodes belonging to a certain MNO may have the same EPLMN list associated with them. In some embodiments, the EPLMN list may be specific to a WD. In some embodiments, the EPLMN list may be specific for a certain MNO. In some embodiments, the EPLMN list may be based on a subscription of the WD, for example a user of a WD may have different options depending on the amount they choose to pay, such that the more the user pays for this subscription the more networks are included in the EPLMN list.

In some embodiments, the step of obtaining 204 an EPLMN list is based on the location of the WD. By basing the step of obtaining 204 an EPLMN list on the location of the WD, it becomes possible to only include networks which are relevant for the WD to consider in its current position. For example, if a WD is roaming close to the border between Finland and Sweden, it would perhaps not be relevant to include Danish networks in the EPLMN list for that WD.

In some embodiments, the RPI is obtained as a policy rule from the Policy Control Function, PCF, or from the Policy and Charging Rules Function, PCRF, of the network.

In some embodiments, the RPI is obtained as subscription information from the Unified Data Management, UDM, or from the Home Subscriber Server, HSS, of the network. The RPI may for example be obtained at attach, registration or in a subscription update.

In some embodiments, the RPI is a new information element comprised in a message, for example a message sent between the core network and a network node in the wireless communications network. By introducing a new information element which indicates whether or not a device has RPI, it becomes easier to handle further implementations and developments related to the RPI concept.

In some embodiments, the RPI is based on existing information. In some embodiments, the RPI is based on existing quality information, such as Quality of Service Class Identifier, QCI. In some embodiments, the RPI may be based on other existing information such as the Service Profile Identifier, SPID. In some embodiments, the RPI is based on International Mobile Subscriber Identity, IMSI, or on an IMSI range. By basing the RPI on already existing information, it could be implemented more easily into existing systems. This may e.g. be relevant during an interim period, or it may be relevant as a final solution.

Figure 3:
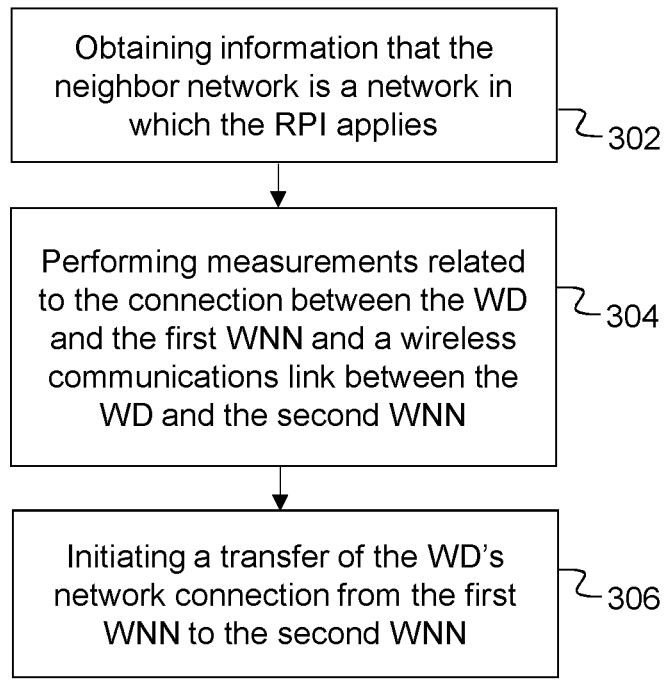
FIG. 3 schematically shows method steps of a second embodiment of a method for handling connections.

FIG. 3, in conjunction with FIG. 1, shows an embodiment of a method performed by WD 120, 130. The WD is operable for communication with a wireless communications network 100 comprising a first WNN 110 of a serving network and a second WNN 140 of a visiting network, wherein the WD 120, 130 has a network connection to the first WNN, and wherein the WD 120, 130 is able to receive signals from the second WNN. The WD 120, 130 has a roaming priority indication, RPI, associated with it, the RPI indicating that the WD 120, 130 has a higher priority for transfer of its network connection in some networks.

The method comprises obtaining 304 information that the neighbor network is a network to which the RPI applies, i.e. that the neighbor network is a network to which the WD has priority for transferring its network connection compared with a WD not having a RPI. The information that the neighbor network is a network in which the RPI applies may in some embodiments be obtained from the second WNN, and in some embodiments this information may be obtained from the first WNN.

The method further comprises performing 306 measurements related to the connection between the WD and the first WNN and a wireless communication link between the WD and the second WNN. The purpose for the performing 306 of measurements is in most embodiments to determine how suitable each of the first WNN and the second WNN is for the WD to have its network connection to.

The method then comprises a step of, based on the RPI, the obtained information from step 304 and the obtained measurements from step 306, initiating 308 a transfer of the WD's network connection from the first WNN to the second WNN. In most embodiments, the transfer of the WD's network connection, when initiated by the WD, is an idle mode mobility transfer of the WD's network connection from the first WNN to the second WNN.

In most embodiments, the transfer of the WD's network connection is only initiated if the measurements obtained in step 306 indicates that it would be more suitable for the WD to have its network connection to the second WNN rather than to the first WNN. Which WNN is more suitable for the WD to have its network connection to is typically determined by factors such as the WD's location, the signal quality of signals sent between the first WNN and the WD, the signal quality of signals sent between the second WNN and the WD, and similar data.

In some embodiments, the obtaining 304 information that the neighbor network is a network to which the RPI applies comprises obtaining an Equivalent Public Land Mobile Network, EPLMN, list comprising a list of PLMNs to which the WD has a higher priority for transfer of its network connection than another WD not having the RPI, wherein the EPLMN list comprises the neighbor network. In some embodiments the EPLMN list comprises the MCC and the MNC of each network to which the network connection of a WD having a RPI may be transferred with a higher priority than network connections of WD's not having the RPI. In some embodiments, the EPLMN list comprises the MCC and MNC of some, but not all, of the networks to which the RPI applies.

In some embodiments, the step of obtaining 304 an EPLMN list is based on a location of the WD. By having the obtaining step 304 based on the location of the WD, the EPLMN list only needs to include networks which are relevant for the WD based on its location, such that networks which are too far away to be relevant are not included in the EPLMN list.

In some embodiments the RPI is obtained as a policy rule from PCRF/PCF. In some embodiments, the RPI is obtained as subscription information from HSS/UDM.

In some embodiments the RPI is a new information element comprised in a message. In some embodiments the RPI is based on existing quality information, such as QCI.

Figure 4:
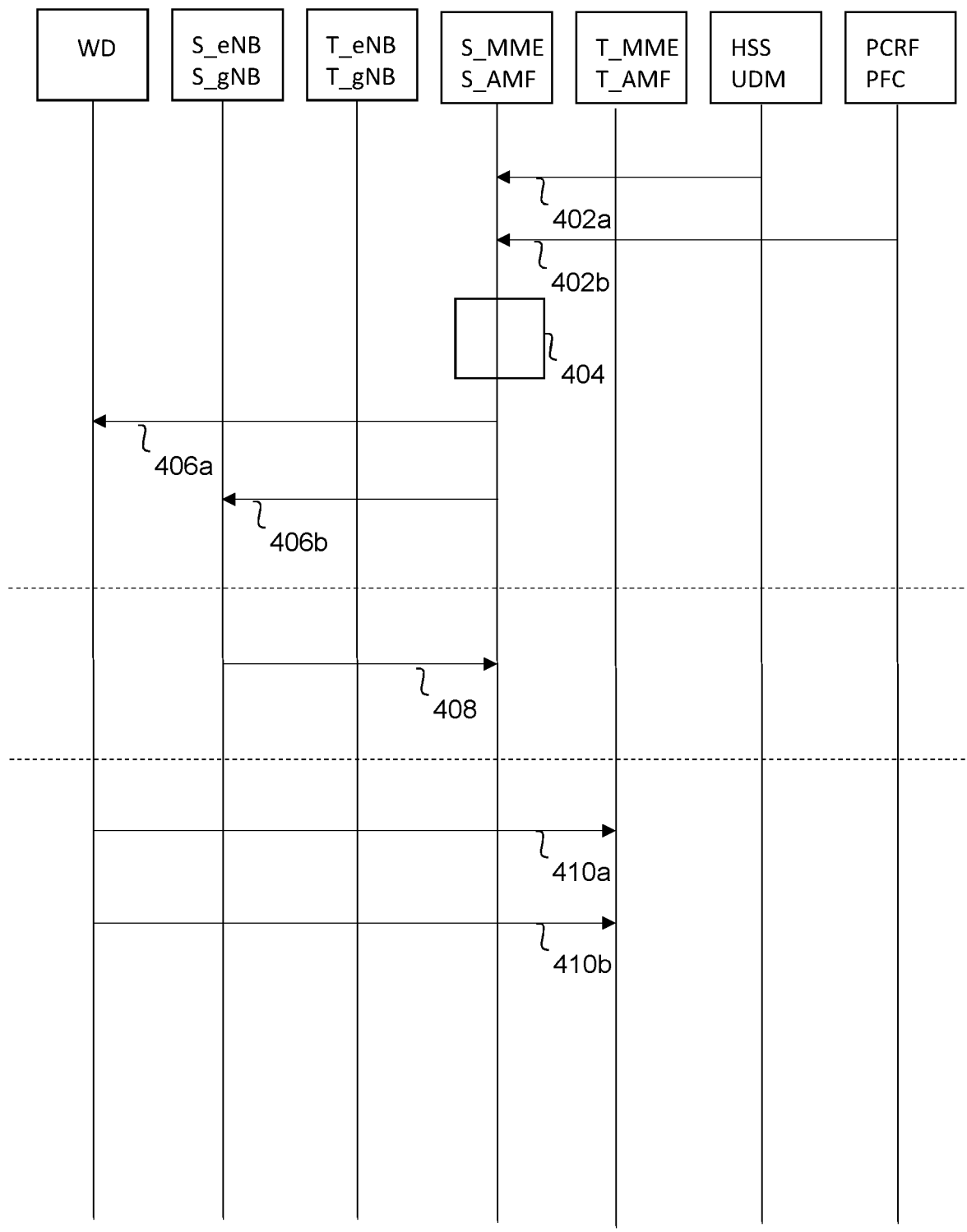
FIG. 4 shows a signaling diagram according to the first and second embodiments.

FIG. 4 shows some of the signaling between nodes relevant for the present disclosure, which roughly correspond to the method steps for the system and for the WD described above. S_eNB/S_gNB denote the first, i.e. source, WNN, and T_eNB/T_gNB denote the second, i.e. target, WNN. S_MME and T_MME denote source (i.e. belonging to the first WNN of the serving network) and target (i.e. belonging to the second WNN of the neighbor network) Mobility Management Entities, respectively. S_AFM and T_AMF are source and target Access and Mobility Management Functions, respectively. HSS denotes Home Subscriber Server, UDM denotes Unified Data Management. PCF denotes Policy Control Function and PCRF denotes Policy and Charging Rules Function.

In a first step, the Roaming Priority Indication is sent from HSS/UDM, as shown in step 402a, or from PCRF/PCF, as shown in step 402b, to the MME/AMF of the serving network.

In a second step 404, the MME/AMF configures or obtains an EPLMN list. As previously described, the EPLMN list may comprise all networks in which the RPI applies, or it may describe some of the networks in which the RPI applies. The configuring or obtaining of the EPLMN list may in some embodiments be based on the location of the MME/AMF, or the WNN corresponding to the MME/AMF. In some embodiments, the configuring or obtaining the EPLMN list may be based on the MNO of the MME/AMF in question, such that different MNOs may have different collaborations or agreements with other MNOs which dictate which MNOs are part of which EPLMN lists. In some embodiments, the configuring of an EPLMN list may be based on the location of the WD connected to the first WNN.

In some embodiments, the EPLMN list may be configured in the first WNN prior to obtaining the RPI.

Then, the EPLMN list may be sent from the MME/AMF to the first WNN of the serving network in a step 406a, wherein the EPLMN list may be sent over the Non-Access Stratum, NAS. The EPLM list may also be sent the WD which has a network connection to the first WNN in a step 406b. The EPLMN list may in some embodiments be comprised in a Handover Restriction List.

Then, a transfer of the WD's network connection is triggered, which may be done in a step 408 for a connected mode transfer wherein a handover is triggered by the first WNN to the target network node, i.e. the second WNN, based on measurements received from the WD. The WD measurements are controlled by the source RAN and are done in the PLMNs in the EPLMN list, i.e. in PLMNS in which the WD has roaming priority. In some embodiments, the source RAN, i.e. the first WNN, finds a RAN to which the WD can be handed over and then sends a Handover Required message to the source core network. In some embodiments, the handover may be performed as specified in 3GPP TS23.401 and TS23.502.

The transfer of the WD's network connection can also be triggered in a step 410a for an idle mode transfer, which is typically triggered by the WD and is done when there is no support for a connected mode handover, for example due to a bad network connection to the first WNN. In some embodiments, the transfer of connection is a release with redirect initiated by the first WNN, shown in step 410b which may be done due to a bad connection between the WD and the first WNN. The release with redirect may direct the WD to a relevant frequency. The redirection may be based on WD measurements controlled by the serving network and are done on the PLMNs in the PLMN list, i.e. PLMNS in which the WD has roaming priority. The transfer of the WD's network connection may further comprise that the WD sends a Tracking Area Update, TAU, request to the second WNN. The WD may also use the EPLMN list to perform cell reselection to PLMNs in which it has roaming priority. In some embodiments, the transfer of connection is an idle mode mobility transfer initiated by the WD. When the WD connects to a new WNN in a new Tracking Area, the WD can send a Tracking Area Update, TAU, request with active flag set to the target WNN. In some embodiments, the TAU may be performed as specified in 3GPP TS23.401 and TS23.502.

Figure 5:
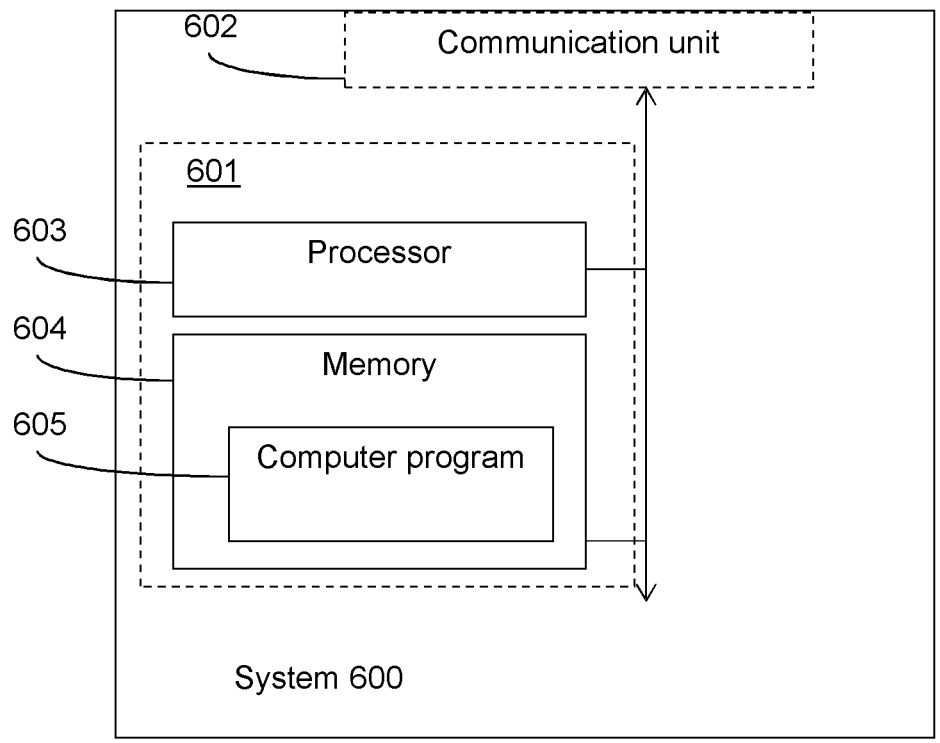
FIG. 5 shows a block schematic of a wireless network node.

FIG. 5, in conjunction with FIG. 1, shows a system 600, operable in a wireless communications network 100 and configured for handling connections between WNNs and a WD 120,130. The wireless communications network 100 comprises a first WNN 110 of a serving network and a second WNN 140 of a neighbor network. The WD 120, 130 has a network connection to the first WNN 110, and the WD is able to receive signals from the second WNN 140.

The system 600 comprises processing circuitry 603 and a memory 604. The processing circuitry 603 may comprise one or more programmable processor, application-specific integrated circuits, field programmable gate arrays or combinations of these (not shown) adapted to execute instructions. The memory contains instructions executable by said processing circuitry, whereby the system 600 is operative for obtaining a RPI associated with the WD, wherein the RPI indicates that the WD 120, 130 has a higher priority for transfer of its network connection than another WD not having the RP. The system 600 is further operative for obtaining information that the neighbor network is a network to which the RPI applies, i.e. that the neighbor network is a network in which the WD has a higher priority for transfer of its network connection than a WD not having the RPI. The system 600 is further operative for obtaining measurements related to at least one of the connection between the WD and the first WNN, and a wireless communications link between the WD and the second WNN. The system 600 is further operative for initiating a transfer of the WD's network connection from the first WNN to the second WNN, based on the obtained measurements, the obtained information that the neighbor network is a network to which the RPI applies, and the obtained RPI.

The system of the wireless communication network that performs the method may be a wireless communication network node, such as a core network node or an access network node or a router, for example the first WNN. Alternatively, the system of the wireless communication network that performs the method may be a group of network nodes, wherein functionality for performing the method are spread out over different physical, or virtual, nodes of the network. In other words, the system for handling WD connection may be a cloud-solution, i.e. the system may be deployed as cloud computing resources that may be distributed in the network.

According to an embodiment, the system 600 is further operative for transmitting the RPI to the second WNN, prior to initiating the transfer of the WD's network connection.

According to an embodiment, the system 600 is further operative for obtaining an Equivalent Public Land Mobile Network, EPLMN, list comprising a list of PLMNs to which the WD has a higher priority for transfer of its network connection than another WD not having the RPI, wherein the EPLMN list comprises the neighbor network.

According to an embodiment, the step of obtaining measurements related to at least one of the connection between the WD and the first WNN, and a wireless communications link between the WD and the second WNN is based on the obtained information that the neighbor network is a network to which the WD has a higher priority for transfer of its network connection than another WD not having the RPI, such that the measurements in step are only obtained after it has been ascertained that the second WNN is a network in which the RPI applies.

According to an embodiment, the step of obtaining an EPLMN list comprises configuring the EPLMN list. The EPLMN list may be configured by the first WNN, or it may be configured by the core network and then transmitted to the first WNN.

According to an embodiment, the step of obtaining an EPLMN list is based on the location of the WD.

According to an embodiment, the RPI is obtained as a policy rule from the Policy Control Function, PFC, for 5G, or from the Policy and Charging Rules Function, PCRF, for 3G.

According to an embodiment, the RPI is obtained as subscription information from the Unified Data Management, for 5G, or from the Home Subscriber Server for 4G, or the Home Location Register for 3G According to an embodiment, the RPI is a new information element comprised in a message, for example a message sent between the core network and a network node in the wireless communications network According to an embodiment, the RPI is based on existing information. In some embodiments, the RPI is based on existing quality information, such as Quality of Service Class Identifier, QCI. In some embodiments, the RPI may be based on other existing information such as the Service Profile Identifier, SPID.

According to other embodiments, the system 600 may further comprise a communication unit 602, which may be considered to comprise conventional means for communicating with the WD 120, 130. The instructions executable by said processing circuitry 603 may be arranged as a computer program 605 stored e.g. in the memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above.

The computer program 605 may comprise computer readable code means, which when run in a system 600 causes the system 600 to perform the steps described in any of the described embodiments of the system 600. The computer program 605 may be carried by a computer program product connectable to the processing circuitry 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the base station configured for airborne use 155 has access via the communication unit 602. The computer program may then be downloaded from the server into the memory 604.

Figure 6:
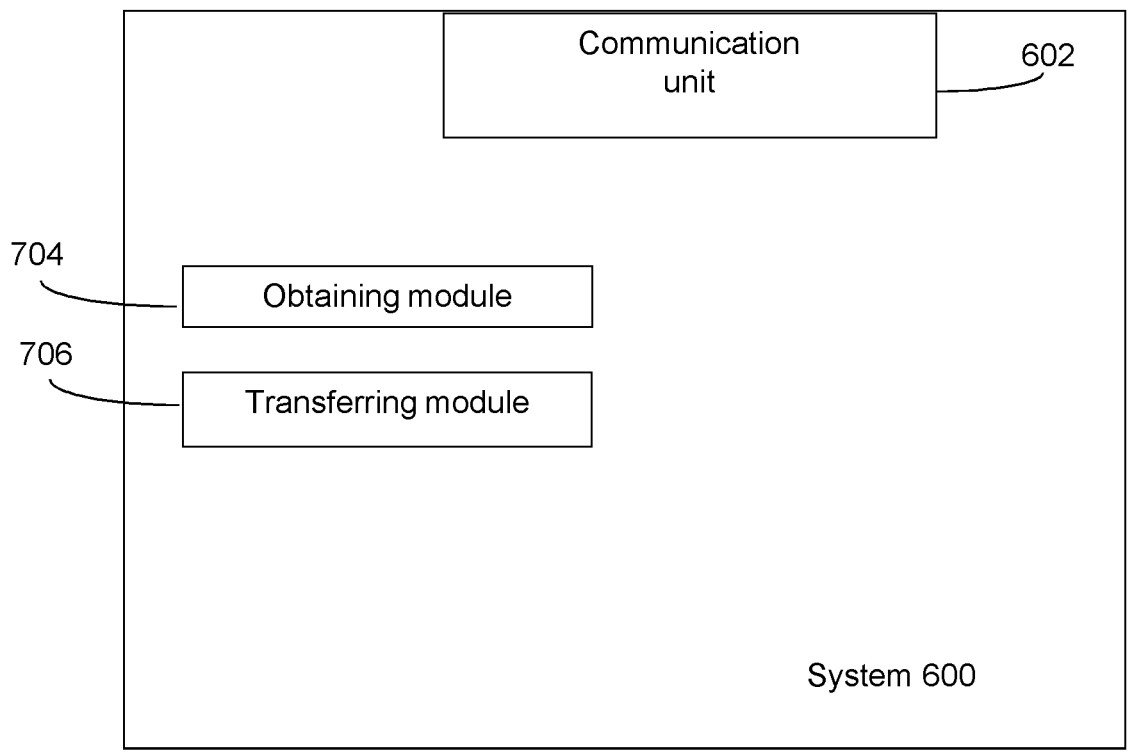
FIG. 6 shows a block schematic of a wireless network node.

FIG. 6, in conjunction with FIG. 1, shows an alternative embodiment of a system 600, wherein the system 600 is operable in a wireless communications network 100 and configured for handling connections between WNNs and a WD 120,130. The wireless communications network 100 comprises a first WNN 110 of a serving network and a second WNN 140 of a neighbor network. The WD 120, 130 has a network connection to the first WNN 110, and the WD is able to receive signals from the second WNN 140. The system comprise an obtaining module 704 for obtaining a RPI associated with the WD, wherein the RPI indicates that the WD 120, 130 has a higher priority for transfer of its network connection than another WD not having the RPI, and for obtaining information that the neighbor network is a network to which the RPI applies, i.e. that the neighbor network is a network in which the WD has a higher priority for transfer of its network connection than a WD not having the RPI, and for obtaining measurements related to at least one of the connection between the WD and the first WNN, and a wireless communications link between the WD and the second WNN. The system 600 further comprises a transferring module 706 for initiating a transfer of the WD's network connection from the first WNN to the second WNN, based on the obtained measurements, the obtained information that the neighbor network is a network to which the RPI applies, and the obtained RPI. The system 600 may further comprise a communication unit 602 similar to the communication unit of FIG. 5. In some embodiments, the modules 704, 706, 602 are implemented as a computer program running on processing circuitry such as a processor.

Figure 7:
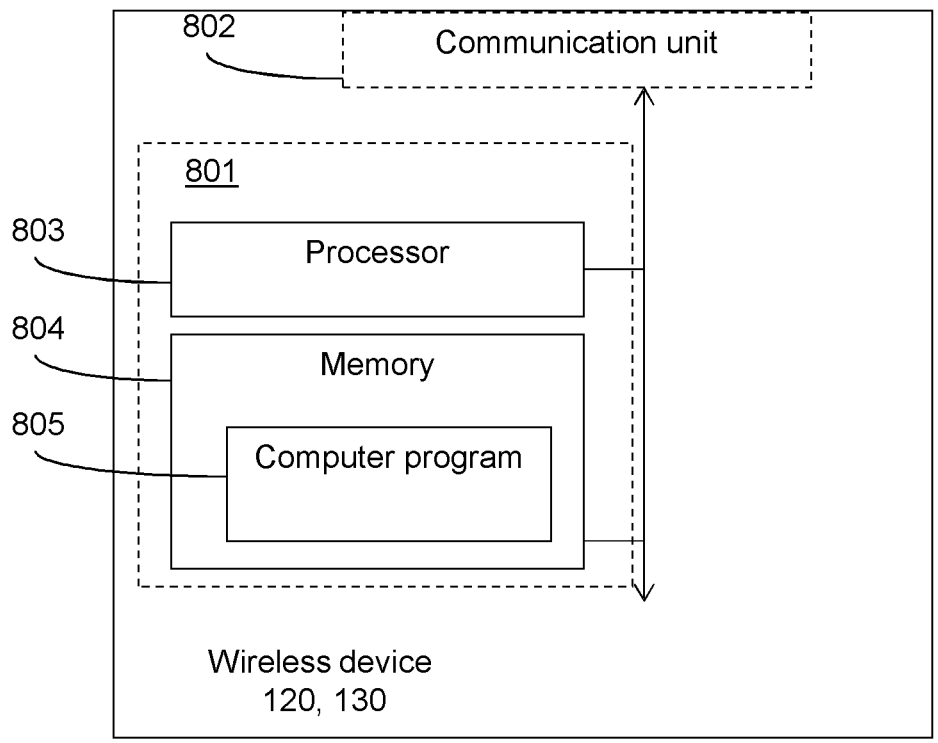
FIG. 7 shows a block schematic of a wireless device.

FIG. 7, in conjunction with FIG. 1, shows a WD 120, 130, operable for wireless communication with a wireless communications network 100. The wireless communications network 100 comprises a first WNN 110 of a serving network and a second WNN 140 of a neighbor network. The WD 120, 130 is operable to have a network connection to the first WNN 110, and further operable to receive signals from the second WNN 140. The WD 120, 130 has a roaming priority indication, RPI, associated with it, the RPI indicating that the WD 120, 130 has a higher priority for transfer of its network connection in some networks. The WD 120, 130 comprises processing circuitry 803 and a memory 804. The processing circuitry 803 may comprise one or more programmable processors, application-specific integrated circuits, field programmable gate arrays or combinations of these (not shown) adapted to execute instructions. The memory contains instructions executable by said processing circuitry, whereby the WD 120, 130 is operative for obtaining information that the neighbor network is a network to which the RPI applies, i.e. that the neighbor network is a network to which the WD has priority for transferring its network connection compared with a WD not having a RPI. The WD 120, 130 is further operative for performing 306 measurements related to the connection between the WD and the first WNN and a wireless communication link between the WD and the second WNN. The WD 120, 130 is further operative for, based on the RPI, the obtained information and the obtained measurements, initiating a transfer of the WD's network connection from the first WNN to the second WNN.

According to an embodiment, the obtaining information that the neighbor network is a network to which the RPI applies comprises obtaining an Equivalent Public Land Mobile Network, EPLMN, list comprising a list of PLMNs to which the WD has a higher priority for transfer of its network connection than another WD not having the RPI, wherein the EPLMN list comprises the neighbor network.

According to an embodiment, the step of obtaining an EPLMN list is based on a location of the WD.

According to an embodiment, the RPI is obtained as a policy rule from the Policy Control Function, PFC, for 5G, or from the Policy and Charging Rules Function, PCRF, for 3G.

According to an embodiment, the RPI is obtained as subscription information from the Unified Data Management, for 5G, or from the Home Subscriber Server for 4G, or the Home Location Register for 3G According to an embodiment, the RPI is a new information element comprised in a message, for example a message sent between the core network and a network node in the wireless communications network, or between a network node and a wireless device.

According to an embodiment, the RPI is based on existing information. In some embodiments, the RPI is based on existing quality information, such as Quality of Service Class Identifier, QCI. In some embodiments, the RPI may be based on other existing information such as the Service Profile Identifier, SPID.

According to other embodiments, the WD 120, 130 may further comprise a communication unit 802, which may be considered to comprise conventional means for communication with the first WNN 110 well as for communicating with other WNNs, such as the second WNN 140. The communication unit 802 may for this reason comprise transmitting units for transmitting wireless signals and receiving units for receiving wireless signals. The instructions executable by said processing circuitry 803 may be arranged as a computer program 805 stored e.g. in said memory 804. The processing circuitry 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the actions and/or methods mentioned above.

The computer program 805 may comprise computer readable code means, which when run in the WD 120, 130 causes the WD to perform the steps described in any of the described embodiments of the WD. The computer program 805 may be carried by a computer program product connectable to the processing circuitry 803. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the communication network to which the WD has access via the communication unit 802. The computer program may then be downloaded from the server into the memory 804.

Figure 8:
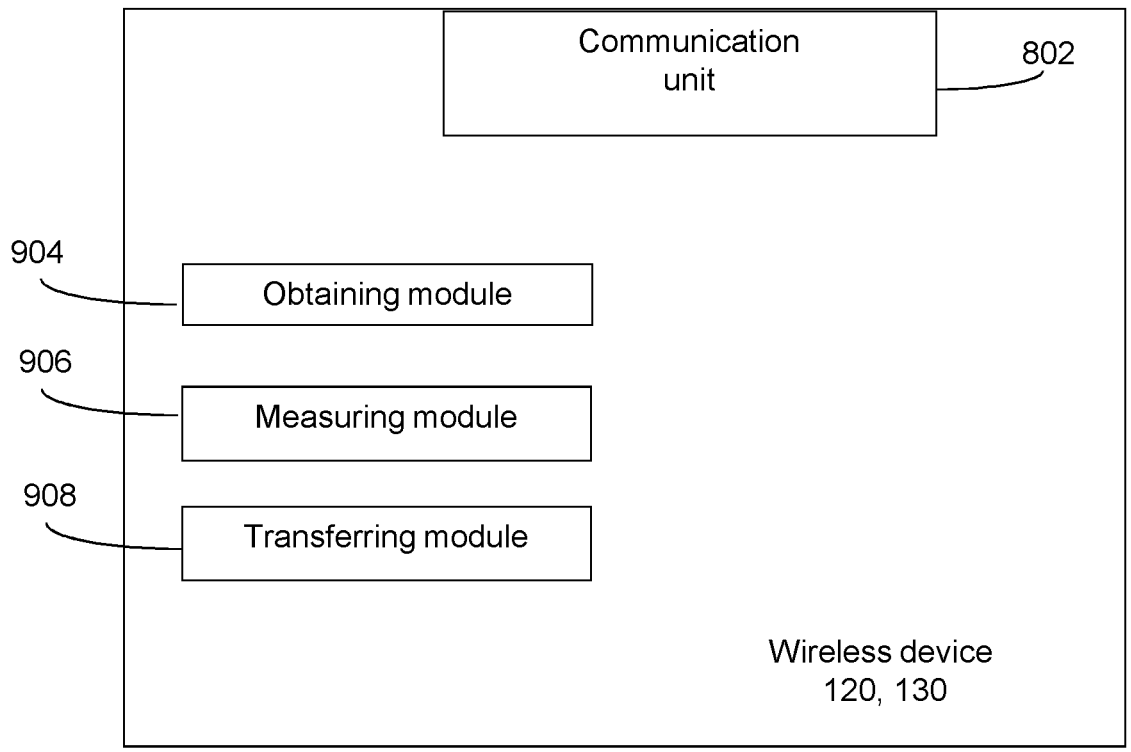
FIG. 8 shows a block schematic of a wireless device.
Figure 9:
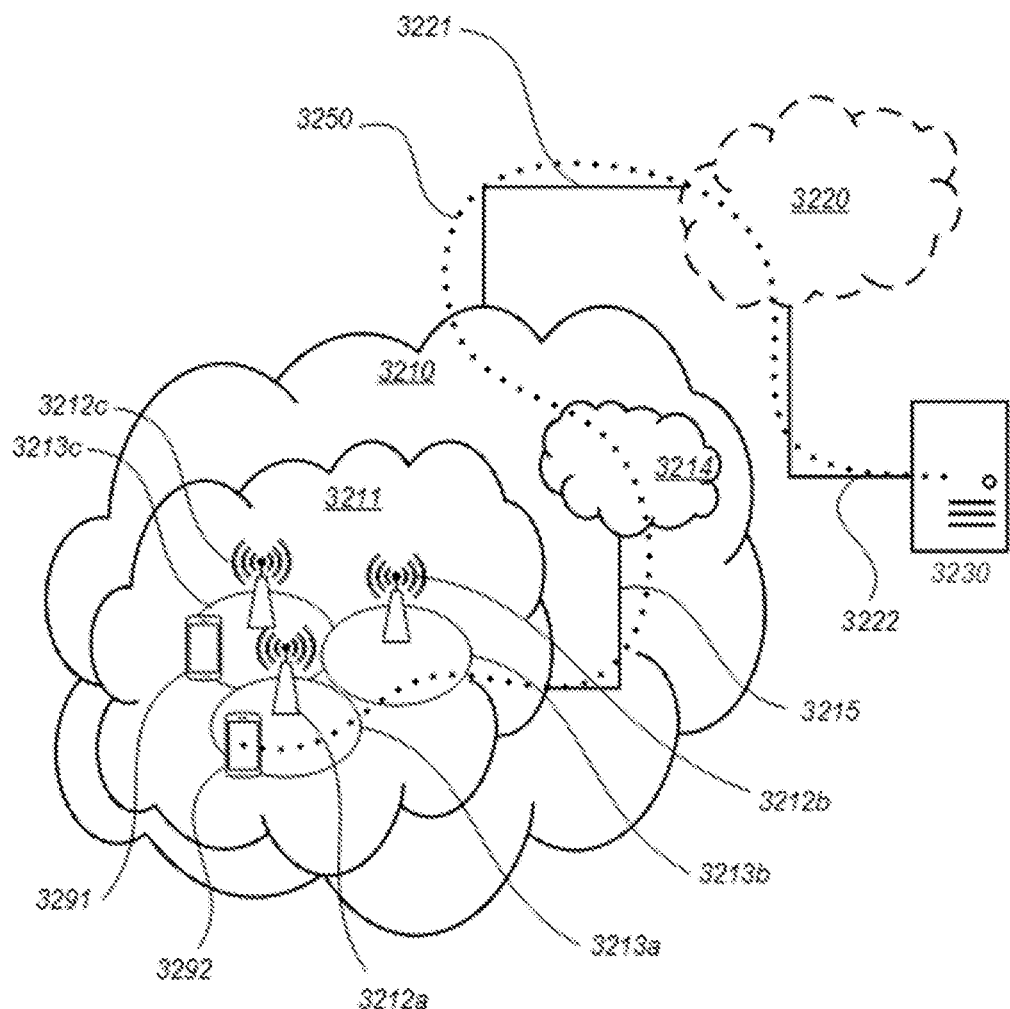
FIG. 9 schematically illustrates a telecommunication network connected via an intermediate network to a host computer.
Figure 10:
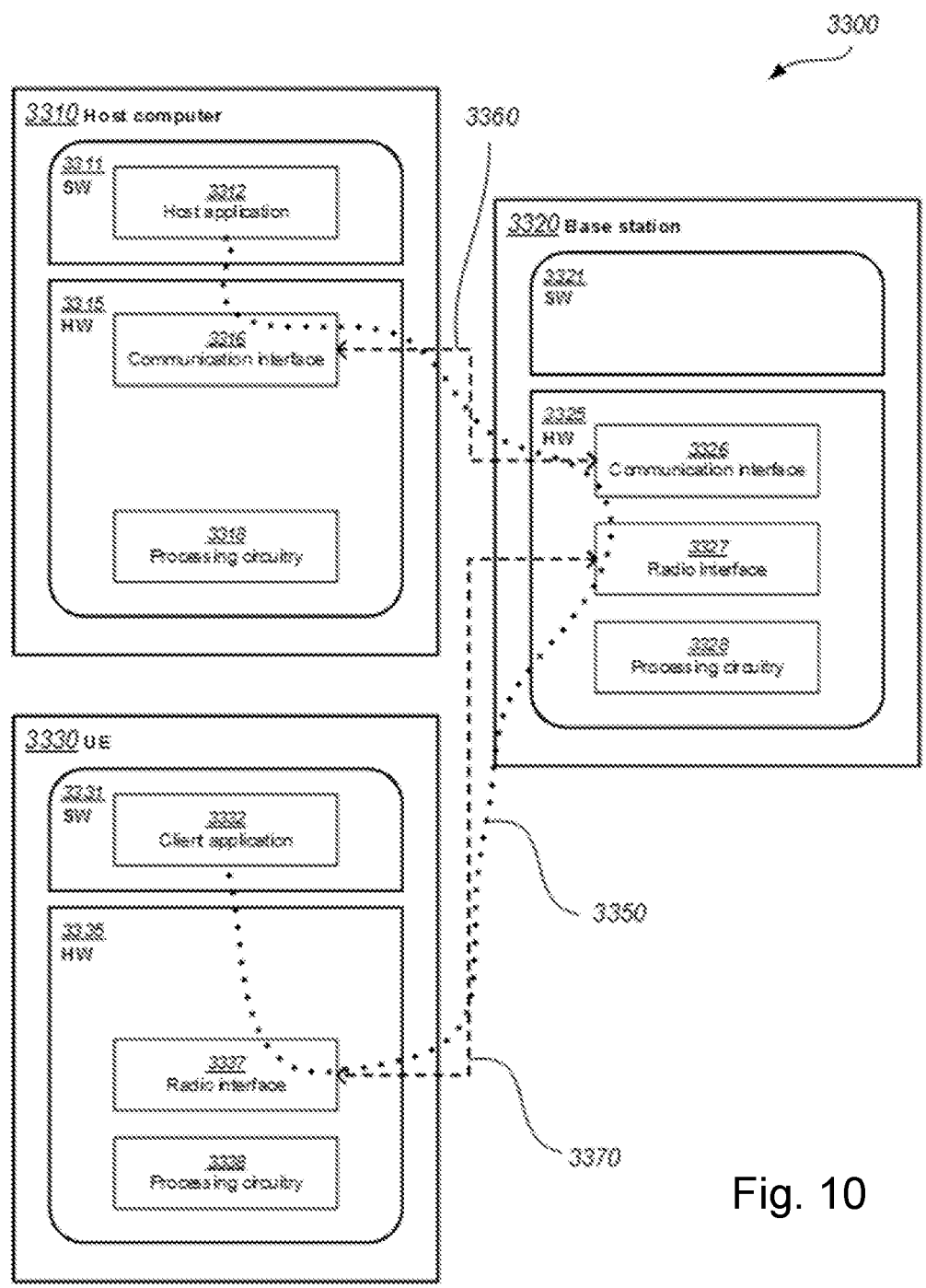
FIG. 10 is a generalized block diagram of a host computer communicating via a wireless network node with a wireless device over a partially wireless connection.
Figures 13, 14:
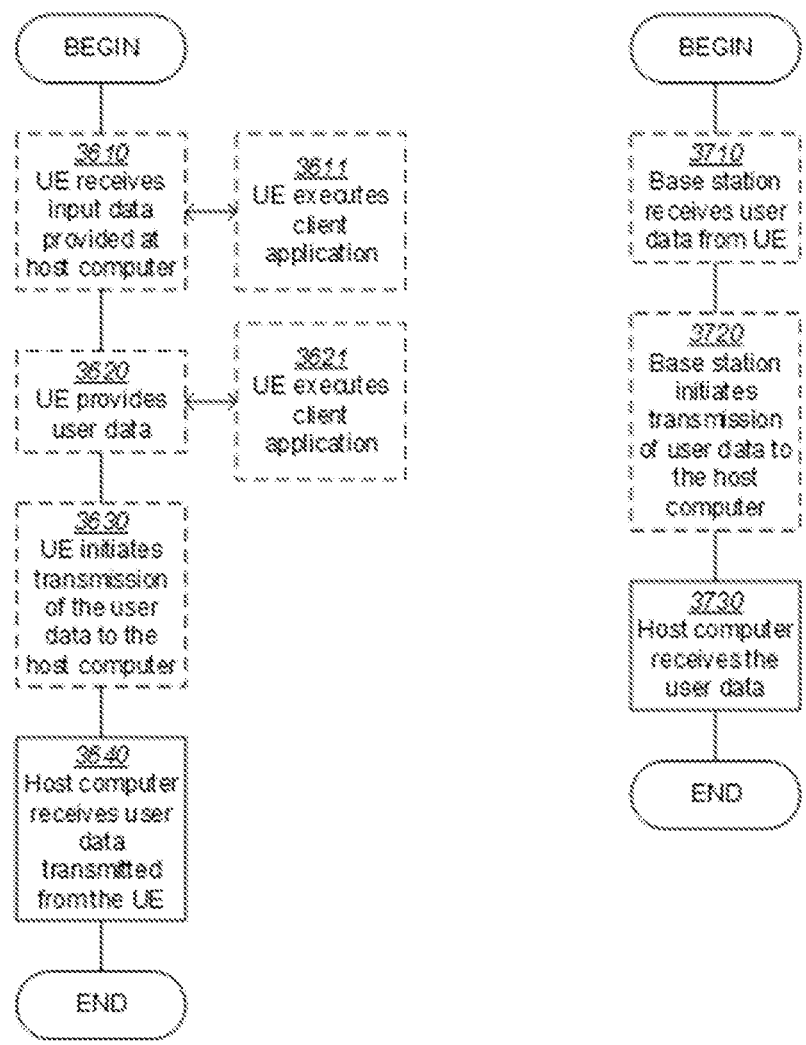

FIG. 8, in conjunction with FIG. 1, shows an alternative embodiment of a WD 120, 130 operable for wireless communication with a wireless communications network 100. The wireless communications network 100 comprises a first WNN 110 of a serving network and a second WNN 140 of a neighbor network. The WD 120, 130 is operable to have a network connection to the first WNN 110, and further operable to receive signals from the second WNN 140. The WD 120, 130 has a roaming priority indication, RPI, associated with it, the RPI indicating that the WD 120, 130 has a higher priority for transfer of its network connection in some networks. The WD comprises a obtaining module 904 for obtaining information that the neighbor network is a network to which the RPI applies, i.e. that the neighbor network is a network to which the WD has priority for transferring its network connection compared with a WD not having a RPI. The WD 120, 130 further comprises a measuring module 906 for performing measurements related to the connection between the WD and the first WNN and a wireless communication link between the WD and the second WNN. The WD 120, 130 further comprises a transferring module 908 for, based on the RPI, the obtained information and the obtained measurements, initiating a transfer of the WD's network connection from the first WNN to the second WNN.

More possible embodiments will now be described. Embodiments DS5-DS36 represent a downstream aspect of the radio-related invention, and embodiments US45-US77 represent an upstream aspect of the radio-related invention. In addition to the embodiments described below, optional embodiments similar to the embodiments for the system of FIGS. 5 and 6, and the embodiments for the WD of FIGS. 7 and 8, may also be applicable to the below described embodiments. The base station referenced above in reference to FIGS. 9-14 and in the embodiments below may be the system of the first aspect of the invention. The numbered embodiments below may be implemented in wireless communications networks similar to the ones described in relation to aspects of the invention. For example, the wireless communications network may comprise a first WNN of a serving network to which the WD is connected and second WNN of a neighbor network. The WD may have a RPI associated with it, the RPI indicating that the WD has a higher priority for transfer of its network connection than a WD not having the RPI. The term user equipment, UE, is used interchangeably with WD below.

Numbered Embodiments

DS5. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured for
obtaining a roaming priority indication, RPI, associated with the wireless device, the RPI indicating that the wireless device has a higher priority for transfer of its network connection than another WD not having the RPI;
obtaining information that the neighbor network is a network to which the RPI applies;
obtaining measurements related to at least one the connection between the WD and the first WNN, and a wireless communications link between the WD and the second WNN;
based on the obtained measurements, the obtained information and the RPI, initiating a transfer of the WD's network connection from the first WNN to the second WNN DS6. The communication system of embodiment DS5, further including the base station.

DS7. The communication system of embodiment DS6, further including the UE, wherein the UE is configured to communicate with the base station.

DS8. The communication system of embodiment DS7, wherein:
the processing circuitry of the host computer is configured to execute a host application, thereby providing the user data; and
the UE comprises processing circuitry configured to execute a client application associated with the host application.

DS15. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station
obtaining a roaming priority indication, RPI, associated with the wireless device, the RPI indicating that the wireless device has a higher priority for transfer of its network connection than another WD not having the RPI;
obtaining information that the neighbor network is a network to which the RPI applies;
obtaining measurements related to at least one the connection between the WD and the first WNN, and a wireless communications link between the WD and the second WNN;
based on the obtained measurements, the obtained information and the RPI, initiating a transfer of the WD's network connection from the first WNN to the second WNN.

DS16. The method of embodiment DS15, further comprising:
at the base station, transmitting the user data.

DS17. The method of embodiment DS16, wherein the user data is provided at the host computer by executing a host application, the method further comprising:
at the UE, executing a client application associated with the host application.

DS25. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured for
obtaining information that the neighbor network is a network to which the RPI applies;
performing measurements related to the connection between the WD and the first WNN and a wireless communications link between the WD and the second WNN;
based on the RPI, the obtained information and on the measurements, initiating a transfer of the WD's network connection from the first WNN to the second WNN.

DS26. The communication system of embodiment DS25, further including the UE.

DS27. The communication system of embodiment DS26, wherein the cellular network further includes a base station configured to communicate with the UE.

DS28. The communication system of embodiment DS26 or DS27, wherein:
the processing circuitry of the host computer is configured to execute a host application, thereby providing the user data; and
the UE's processing circuitry is configured to execute a client application associated with the host application.

DS35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE
obtains information that the neighbor network is a network to which the RPI applies;
performs measurements related to the connection between the WD and the first WNN and a wireless communications link between the WD and the second WNN;
based on the RPI, the obtained information and on the measurements, initiates a transfer of the WD's network connection from the first WNN to the second WNN.

DS36. The method of embodiment DS35, further comprising:
at the UE, receiving the user data from the base station.

US45. A communication system including a host computer comprising:
a communication interface configured to receive user data originating from a transmission from a user equipment (UE) to a base station,
wherein the UE comprises a radio interface and processing circuitry, the UE's processing circuitry configured for:
obtaining information that the neighbor network is a network to which the RPI applies;
performing measurements related to the connection between the WD and the first WNN and a wireless communications link between the WD and the second WNN;
based on the RPI, the obtained information and on the measurements, initiating a transfer of the WD's network connection from the first WNN to the second WNN.

US46. The communication system of embodiment US45, further including the UE.

US47. The communication system of embodiment US46, further including the base station, wherein the base station comprises a radio interface configured to communicate with the UE and a communication interface configured to forward to the host computer the user data carried by a transmission from the UE to the base station.

US48. The communication system of embodiment US46 or US47, wherein:
the processing circuitry of the host computer is configured to execute a host application; and
the UE's processing circuitry is configured to execute a client application associated with the host application, thereby providing the user data.

US49. The communication system of embodiment US46 or US47, wherein:
the processing circuitry of the host computer is configured to execute a host application, thereby providing request data; and
the UE's processing circuitry is configured to execute a client application associated with the host application, thereby providing the user data in response to the request data.

US55. A method implemented in a communication system including a host computer, a base station and a user equipment (UE), the method comprising:
at the host computer, receiving user data transmitted to the base station from the UE, wherein the UE
obtains information that the neighbor network is a network to which the RPI applies;
performs measurements related to the connection between the WD and the first WNN and a wireless communications link between the WD and the second WNN;

based on the RPI, the obtained information and on the measurements, initiates a transfer of the WD's network connection from the first WNN to the second WNN.

US56. The method of embodiment US55, further comprising:

at the UE, providing the user data to the base station.

US57. The method of embodiment US56, further comprising:

at the UE, executing a client application, thereby providing the user data to be transmitted; and at the host computer, executing a host application associated with the client application.

US58. The method of embodiment US56, further comprising:

at the UE, executing a client application; and at the UE, receiving input data to the client application, the input data being provided at the host computer by executing a host application associated with the client application, wherein the user data to be transmitted is provided by the client application in response to the input data.

US65. A communication system including a host computer comprising a communication interface configured to receive user data originating from a transmission from a user equipment (UE) to a base station, wherein the base station comprises a radio interface and processing circuitry, the base station's processing circuitry configured for obtaining a roaming priority indication, RPI, associated with the wireless device, the RPI indicating that the wireless device has a higher priority for transfer of its network connection than another WD not having the RPI;

obtaining information that the neighbor network is a network to which the RPI applies;

obtaining measurements related to at least one the connection between the WD and the first WNN, and a wireless communications link between the WD and the second WNN;

based on the obtained measurements, the obtained information and the RPI, initiating a transfer of the WD's network connection from the first WNN to the second WNN.

US66. The communication system of embodiment US65, further including the base station.

US67. The communication system of embodiment US66, further including the UE, wherein the UE is configured to communicate with the base station.

US68. The communication system of embodiment US67, wherein:

the processing circuitry of the host computer is configured to execute a host application;

the UE is configured to execute a client application associated with the host application, thereby providing the user data to be received by the host computer.

US75. A method implemented in a communication system including a host computer, a base station and a user equipment (UE), the method comprising:

at the host computer, receiving, from the base station, user data originating from a transmission which the base station has received from the UE, wherein the UE obtains information that the neighbor network is a network to which the RPI applies;

performs measurements related to the connection between the WD and the first WNN and a wireless communications link between the WD and the second WNN;

based on the RPI, the obtained information and on the measurements, initiates a transfer of the WD's network connection from the first WNN to the second WNN.

US76. The method of embodiment US75, further comprising:

at the base station, receiving the user data from the UE.

US77. The method of embodiment US76, further comprising:

at the base station, initiating a transmission of the received user data to the host computer.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method, performed by a system in a wireless communications network, for handling connections between a wireless device, WD and a first wireless network node, WNN, of a serving network in the wireless communications network, wherein the WD has a network connection to the first WNN and wherein the wireless communications network further comprises a neighbor network comprising a second WNN, the method comprising:

obtaining a roaming priority indication, RPI, associated with the WD, the RPI indicating that the WD has a higher priority for transfer of its network connection than another WD not having the RPI;

obtaining information that the neighbor network is a network to which the RPI applies;

obtaining measurements related to at least one the connection between the WD and the first WNN, and a wireless communications link between the WD and the second WNN;

based on the obtained measurements, the obtained information and the RPI, initiating a transfer of the WD's network connection from the first WNN to the second WNN.

2. A method, performed by a wireless device, WD, in a wireless communications network, for handling connections between the WD and a first wireless network node, WNN, of a serving network in the wireless communications network, wherein the WD has a network connection to the first WNN and wherein the wireless communications network further comprises a neighbor network comprising a second WNN, wherein the WD has a roaming priority indication, RPI, associated with the WD, the RPI indicating that the WD has a higher priority for transfer of its network connection than another WD not having the RPI, the method comprising:

obtaining information that the neighbor network is a network to which the RPI applies;

performing measurements related to the connection between the WD and the first WNN and a wireless communications link between the WD and the second WNN;

based on the RPI, the obtained information and on the measurements, initiating a transfer of the WD's network connection from the first WNN to the second WNN.

3. A system operable in a wireless communications network, for handling connections between a wireless device, WD and a first wireless network node, WNN of a serving network in the wireless communications network, wherein the first WNN is operable to provide a network connection to the WD and wherein the wireless communications network further comprises a neighbor network comprising a second WNN, the system comprising:
  processing circuitry; and
  a memory, said memory containing instructions executable by said processing circuitry, whereby said network node is operative for:
  obtaining a roaming priority indication, RPI, associated with the WD, the RPI indicating that the WD has a higher priority for transfer of its network connection than another WD not having the RPI;
  obtaining information that the neighbor network is a network to which the RPI applies;
  obtaining measurements related to at least one the connection between the WD and the first WNN, and a wireless communications link between the WD and the second WNN;
  based on the obtained measurements, the obtained information and the RPI, initiating a transfer of the WD's network connection from the first WNN to the second WNN.

4. The system according to claim 3, further operative for:
  transmitting the RPI to the second WNN, as a part of the initiating step.

5. The system according to claim 3 wherein the obtaining information that the neighbor network is a network to which the WD has a higher priority for transfer of its network connection than another WD not having the RPI comprises obtaining an Equivalent Public Land Mobile Network, EPLMN, list comprising a list of PLMNs to which the WD has a higher priority for transfer of its network connection than another WD not having the RPI, wherein the EPLMN list comprises the neighbor network.

6. The system according to claim 3, wherein the obtaining measurements is based on the obtained information that the neighbor network is a network to which the RPI applies.

7. The system according to claim 5 wherein the obtaining an EPLMN list comprises configuring the EPLMN list.

8. The system according to claim 5, wherein the obtaining an EPLMN list is based on a location of the WD.

9. The system according to claim 3 wherein the RPI is obtained as a policy rule from PCRF/PCF.

10. The system according to claim 3, wherein the RPI is obtained as subscription information from HSS/UDM.

11. The system according to claim 3 wherein the RPI is a new information element comprised in a message.

12. The system according to claim 3, wherein the RPI is based on existing quality information, such as QCI.

13. A wireless device, WD, operable in a wireless communications network, for handling connections between the WD and a first wireless network node, WNN, of a serving network in the wireless communications network, wherein the WD is operable to have a network connection to the first WNN and wherein the wireless communications network further comprises a second WNN of a neighbor network, wherein the WD has a Roaming Priority Indication, RPI, associated with it, the RPI indicating that the WD has a higher priority for transfer of its network connection than another WD not having the RPI, the WD comprising:
  processing circuitry; and
  a memory, said memory containing instructions executable by said processing circuitry, whereby said WD is operative for:
  obtaining information that the neighbor network is a network to which the RPI applies;
  performing measurements related to the connection between the WD and the first WNN and a wireless communications link between the WD and the second WNN;
  based on the RPI, the obtained information and on the measurements, initiating a transfer of the WD's network connection from the first WNN to the second WNN.

14. The WD according to claim 13, wherein the obtaining information that the neighbor network is a network to which the RPI applies comprises obtaining an Equivalent Public Land Mobile Network, EPLMN, list comprising a list of PLMNs to which the WD has a higher priority for transfer of its network connection than another WD not having the RPI, wherein the EPLMN list comprises the neighbor network.

15. The WD according to claim 14, wherein the obtaining an EPLMN list is based on a location of the WD.

16. The WD according to claim 13 wherein the RPI is obtained as a policy rule from PCRF/PCF.

17. The WD according to claim 13, wherein the RPI is obtained as subscription information from HSS/UDM.

18. The WD according to claim 13, wherein the RPI is a new information element comprised in a message.

19. The WD according to claim 13, wherein the RPI is based on existing quality information, such as QCI.

* * * * *